Patented May 11, 1926.

1,584,235

UNITED STATES PATENT OFFICE.

SEBASTIAN LOMANITZ, OF HOUSTON, TEXAS.

INSECTICIDE.

No Drawing.    Application filed December 27, 1924.  Serial No. 758,395.

My invention relates to insecticide mixtures containing an insecticide, a germicide and a sticker material all in powder form, and the object of the invention is to increase the adherence of the mixture to the plant while applying it.

Another object of the invention is to produce insecticides wherein the danger of burning the plant is reduced.

A still further object of my invention is to produce insecticides having a greater efficiency and which can be produced and utilized more economically.

In the powder form of insecticides it is desirable to use a soap as a sticker material which is usually a soluble soap introduced into the mixture to bring about a better adhesion of the active ingredients of the germicide and insecticide. It is common practice to add lime to the mixture to prevent the arsenic compounds of the mixture from going into the solution, but the lime added carbonates by exposure to the atmosphere, and in that form it helps the arsenic compounds to go into the solution and in consequence causes injury to the plant to which such insecticide has been applied.

I have discovered that certain compounds when introduced into the insecticide mixture will, when the mixture is brought in contact with the moisture on the plant or the spraying tank, interact with the sticker material present in the mixture to form therewith an insoluble sticker material. In other words, instead of relying upon the sticker material, usually a soluble soap, to bring about the adhesion of the insecticide and germicide, I introduce a compound into the mixture which will react with the soluble sticker soap, to form an insoluble sticker soap right on the plant if applied as dust due to the presence of moisture on the plant. If used in the spraying tank, the insoluble sticker soap is applied by the spray from the tank. This results in better adhesion of the mixture, for the sticker material rendered insoluble is not as easily washed off as the soluble sticker material originally present in the mixture. It will, also, at the same time result in a lessened danger of arsenic solubility since the base of the original sticker soap material, which is the cause of the arsenic becoming soluble, is thrown out of action by being converted into a stable soluble salt.

Thus the very fact which was the source of danger when soap stickers are applied in the usual way, is converted into an advantage by the addition of the compound which causes an increased adhesion and decreases the arsenic solubility, thus making my insecticide mixture safer and more efficient.

To the insecticide mixtures, which may contain any of the soapy materials usually recommended for their ability to assist spreading and sticking, is added technical aluminum sulphate in such amount that the aluminum should be substantially equivalent to the base of the soapy material. The soapy material and the aluminum sulphate on coming in contact with the moisture on the plant or the water in the spraying tank will dissolve and interact to form sodium sulphate and a soap of aluminum. The result will be that the danger of the base of the soap attacking the arsenic compound through hydrolysis, will be removed, and the adherence of the arsenical mixture to the plant will be greatly increased on account of the adhesive qualities of the aluminum soap formed right on the plant. This soap being insoluble will not wash off so easily as the soluble sticker soaps usually employed. As a matter of fact, experiments carried out by me show a 75% of adhesion as compared to 25% with some of the mixtures of insecticides containing sticker material.

It will be seen that the original sticker material in my mixture is caused to decompose and serve as a building stone for the formation of a more durable sticker material right where it can assert its greatest effect on the plant. By introducing such a compound as aluminum sulphate to the usual mixture of insecticides, I can use a larger amount of sticker material in the insecticide mixture without increasing the danger of solubility of the arsenic compounds present.

The ratio of aluminum sulphate used to the quantity of the sticker material present in the mixture of the insecticide is roughly of 1 to 5. In other words, if 10% of soluble sticker material soap is used, not less than 2% of aluminum sulphate is added thereto. As a type of an insecticide mixture containing aluminum sulphate, the following may be cited:

| | Per cent. |
|---|---|
| Sulphur | 72½ |
| Lead arsenate | 15 |
| Soluble resinous soap | 10 |
| Aluminum sulphate | 2½ |

The aluminum sulphate referred to is the commercial material used for industrial purposes.

In many cases the presence of lime is detrimental, still it has to be used to prevent the solubility of the arsenic compound present in the mixture. By introducing aluminum sulphate, I obviate the necessity of using lime and I find that the solubility of arsenates is decreased from 5% to .4%, thereby rendering the insecticide mixture safer.

It will be noted that my insecticide mixture is not loaded with inert, extraneous materials such as kieselguhr. Although I prefer to use aluminum sulphate as the cheapest compound available for this purpose, there are other compounds which will produce substantially the same result, that is, re-act with the soluble sticker in presence of moisture and render it insoluble, as an example, salts of iron, zinc, magnesium and calcium may be substituted for the aluminum sulphate, but the latter is preferred over the other salts mentioned as having a very low chemically combining weight so that it takes very little of aluminum sulphate to re-place the base of the soluble stricker soap used.

It may be further remarked that if soluble arsenic compound should form in the insecticide mixture containing aluminum sulphate, the aluminum present will form an insoluble aluminum arsenate.

I claim:

1. An insecticide in powder form comprising a soluble soap and aluminum sulphate in sufficient quantities to re-act with the base of the soap in the presence of moisture.

2. An insecticide containing a soluble soap and aluminum sulphate in ratio of about 5 to 1 respectively.

3. An insecticide containing an arsenic compound, a soluble soap and an aluminum sulphate.

4. An insecticide containing sulphur, lead arsenate, a soapy sticker material and aluminum sulphate in proportions substantially as specified.

5. An insecticide mixture containing an insecticide, a germicide, a soluble soap and aluminum sulphate.

SEBASTIAN LOMANITZ.